J. OTIS.
STREET SWEEPER.
APPLICATION FILED JUNE 19, 1909.

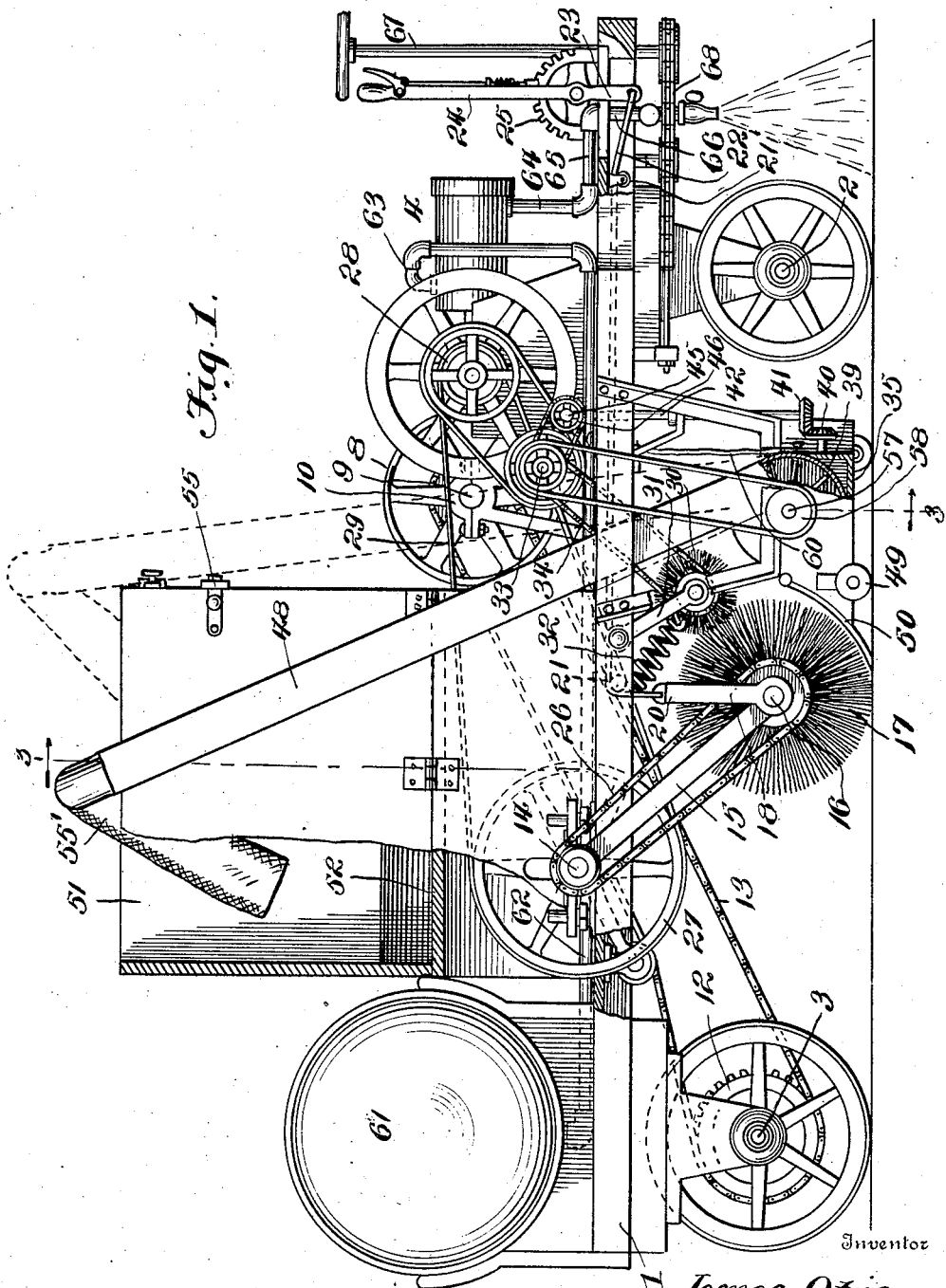

959,380.

Patented May 24, 1910.

3 SHEETS—SHEET 2.

Witnesses
J. T. L. Wright,
W. S. McDowell.

Inventor
James Otis,
By Victor J. Evans.
Attorney

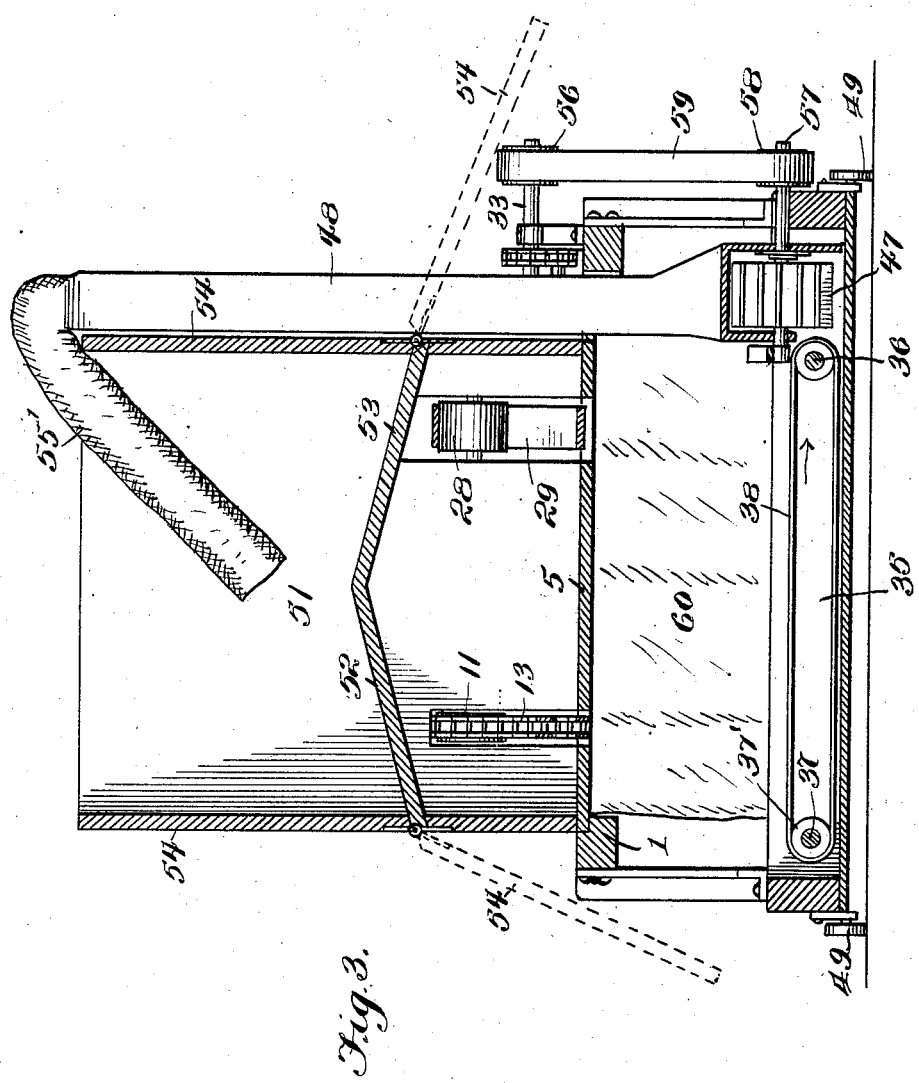

UNITED STATES PATENT OFFICE.

JAMES OTIS, OF ANN ARBOR, MICHIGAN, ASSIGNOR OF ONE-HALF TO FLORA OTIS, OF ANN ARBOR, MICHIGAN.

STREET-SWEEPER.

959,380.   Specification of Letters Patent.   Patented May 24, 1910.

Application filed June 19, 1909. Serial No. 503,123.

*To all whom it may concern:*

Be it known that I, JAMES OTIS, a citizen of the United States, residing at Ann Arbor, in the county of Washtenaw and State of Michigan, have invented new and useful Improvements in Street-Sweepers, of which the following is a specification.

This invention relates to street sweepers, and an object of my invention is to provide a motor driven apparatus of this character, and to also provide a motor operated revoluble sweeping brush disposed adjacent to an endless conveyer belt which latter is adapted to deliver the sweepings received from the brush into a receptacle wherein means will be provided for forcing the dust and foreign matter or sweepings upwardly by an air blast whereby it may be deposited into a receptacle or suitable container.

Other objects and advantages will be apparent as the nature of the invention is better set forth, and it will be understood that changes within the scope of the claims may be resorted to without departing from the spirit of the invention.

In the drawings, forming a portion of this specification and in which like numerals of reference indicate similar parts in the several views:—Figure 1 is a side elevation of the street sweeper. Fig. 2 is a top plan view of the sweeper, parts being shown in section, the receptacle being omitted. Fig. 3 is a detail section taken on the line 3—3 of Fig. 1.

Referring now more particularly to the drawings, it will be seen that my improved street sweeper consists of a frame 1 which is mounted at its front end upon a wheeled axle 2 and at its rear end upon a rear axle 3. A gas engine or suitable motor 4 is mounted upon a platform 5 of the truck or frame 1, and as shown the shaft 6 of the said engine has secured thereto adjacent to one end a friction wheel or gear 7 which is engaged with a driven wheel 8 carried by a countershaft 9. The countershaft 9 is mounted in brackets 10 secured to the platform 5, and as illustrated the shaft 9 carries a sprocket gear 11. The rear axle 3 is provided with a spur gear 12 with which and with the gear 11 is engaged a sprocket chain 13. The construction of the motor above described and its connection with the shaft 3 is such that the wheeled frame can be effectively propelled.

A shaft 14 is revolubly mounted upon the platform 5 and is located preferably at a point rearwardly of the motor 4. Loosely mounted bracket arms 15 extend downwardly and forwardly from the shaft 14, and as shown these arms have mounted therein the ends of a horizontally disposed shaft 16 which is located immediately beneath the platform of the frame 1. The shaft 16 has mounted thereon a horizontally disposed sweeping brush 17 which extends approximately the entire width of the truck frame and is adapted for movement upon the surface of the ground. By mounting the bracket arms 15 upon the shaft 14 in the manner just described it will be appreciated that the said bracket arms are adapted for vertical pivotal movement. The shaft 16 has mounted thereon the downwardly extending arms 18 of a yoke 19. The horizontal portion 20 of the yoke 19 extends transversely of the frame 1 of the machine and is disposed immediately above the brush 17. A plurality of guide pulleys 21 are secured to the platform 5 of the frame 1 and guide a flexible connection 22. The connection 22 is secured at its rear end to the horizontal portion 20 of the yoke 19 and the forward end of said connection is secured in any suitable manner to the depending portion 23 of a lever 24. The lever 24 is pivotally mounted to a rack segment 25 which arises from the platform 5 adjacent to the front end thereof. The lever 24 is provided with any suitable well known form of spring pressed pawl which is adapted for engagement with the teeth of the rack segment. By providing the lever 24 and connecting the same with the yoke 19 it will be seen that the latter can be effectively operated so as to raise the brush 17 above the surface of the ground. The shaft 14 is geared to the shaft 16 by a drive chain 26. The shaft 14 is provided with a pulley 27 which is disposed in line with a pulley 28 upon the shaft 6 of the motor, and as shown these pulleys are connected to each other by a drive belt 29.

A cleaning brush 30 is carried by bracket arms 31 which are pivotally mounted upon the frame 1, and as shown these brackets have engaged therewith the outer extremities of retractile springs 32, the inner extremities of said springs being secured in any suitable well known manner to the frame 1. It will be seen that the springs 32 serve to yieldingly hold the cleaning brush against a portion of the sweeping brush so that in operation of the latter it will be effectively cleaned and relieved of heavy particles of foreign matter. A shaft 33 is mounted upon the platform 5 and is geared to the cleaning brush by a chain drive 34.

A transverse trough 35 is mounted beneath the platform 5 of the frame 1 and is located forwardly of the sweeping brush 17. Spaced shafts 36 and 37 are journaled in the walls of the trough 35 and support rollers 37' upon which an endless carrier belt 38 is mounted. The belt 38 is adapted to travel in the direction of the arrow indicated in Fig. 3 and as shown the said belt communicates at one end with a fan casing 39. The shaft 36 has mounted thereon a bevel gear 40 which is in mesh with a bevel gear 41 which is carried by a vertical driving shaft 42. The shaft 42 extends through the platform 5 and has mounted thereon at its upper end a bevel gear 43 which meshes with a bevel gear 44 carried by a revoluble stub shaft 45. The shaft 45 is connected by means of a chain drive 46 to the shaft 33 and is effectively operated thereby. A fan 47 is mounted in the casing 39 and is located in position to receive foreign matter from the endless conveyer and blow such matter upwardly through a conveying tube 48. The trough 35 is mounted upon suitable rollers or wheels 49 which are adapted to travel upon the surface of the ground. The rear end of the trough 35 is provided with a downwardly and rearwardly curved deflecting plate 50 which is disposed immediately in front of the brush 17.

A receptacle 51 is mounted upon the platform 5, and as shown the said receptacle is provided with a hopper bottom which is formed from downwardly and outwardly extending portions 52 and 53 which are directed toward the sides of said receptacle as shown. The sides of the receptacle are provided with hinged doors or closures 54 which are normally held in their closed positions by means of latches 55 which may be of any well known form as is obvious. The conveying tube 48 extends upwardly and rearwardly from the fan casing and the extreme upper portion thereof has secured thereto one end of a flexible pipe 55', the other end of said pipe being disposed in the receptacle 51. The shaft 33 is provided with a pulley 56, and as shown the fan shaft 57 is provided with a pulley 58. The pulleys 56 and 58 are connected to each other by means of a drive belt 59 which is adapted when the shaft 33 is revolved to effectively revolve the fan 47 so that the desired draft can be created in the fan casing whereby foreign matter delivered to said casing can be effectively conveyed upwardly through the conveying tube and deposited into the receptacle 51.

A fabric apron 60 is secured at its upper edge to the platform 5 and at its lower edge to the front wall of the trough 35 and is adapted to prevent material swept onto the endless carrier being discharged therefrom and to effectively confine the material in the trough as will be readily understood.

A tank or water receptacle 61 is mounted upon the platform at the rear thereof and is provided with a discharge pipe 62 which extends forwardly upon the platform and is preferably connected with a pipe 63 carried by the cylinder of the motor 4. The cylinder of the motor is provided with a depending pipe 64, and as shown this pipe is connected to the branch 65 of a nozzle 66. The nozzle 66 is disposed forwardly of the front axle 2 of the machine and is adapted to discharge the desired spray upon the surface of the ground at a point in suitable spaced relation to the sweeping brush. A steering post 67 is revolubly mounted upon the platform 5 and is geared in any suitable well known manner to a steering chain 68 which is connected to the front axle 2.

The lower end of the conveying tube 48 is pivotally mounted on the shaft 57 so that it can be moved to the dotted line position shown in Fig. 1 when it is desired to open that side portion of the receptacle which is adjacent to the said conveying tube.

I claim:—

1. A street sweeping machine comprising a portable frame, a revoluble brush suspended from the frame and mounted thereon for vertical adjustment, a wheeled trough forwardly of the brush, a conveyer located in the trough, a blast fan at one end of the conveyer, a receptacle, and a conveying tube connecting the receptacle with the blast fan.

2. A street sweeping machine comprising a portable frame, a revoluble brush suspended from the frame and mounted thereon for vertical adjustment, a wheeled trough located forwardly of the brush, a conveyer extending approximately throughout the length of the trough, a blast fan at one end of the trough and disposed immediately outwardly of one end of the conveyer, a receptacle mounted on the frame, and a pivoted conveyer tube communicating with the blast fan and with the said receptacle.

3. A street sweeping machine comprising a portable frame, a sweeping brush extending transversely of the frame and suspended therefrom whereby it can be adjusted vertically, a trough located forwardly of the brush, an endless conveyer located in the trough, a blast fan at one end of the conveyer, a receptacle mounted on the frame, and an angularly adjustable conveyer tube extending upwardly at one side of the receptacle and communicating at one end with the receptacle and at the other end with the blast fan.

In testimony whereof I affix my signature in presence of two witnesses.

JAMES OTIS.

Witnesses:
WM. H. MURRAY,
FLORA M. OTIS.